United States Patent Office 3,544,555
Patented Dec. 1, 1970

3,544,555
SULFATION OF ALCOHOLS WITH A SOLUTION OF A COMPLEX OF $SO_3$ WITH DIMETHYLFORMAMIDE
Laszlo F. Biritz, Cook County, Ill., and Everett E. Gilbert, Morris County, N.J., assignors to Allied Chemical Corporation, New York, N.Y., a corporation of New York
No Drawing. Filed Oct. 9, 1963, Ser. No. 314,877
Int. Cl. C08b 5/14
U.S. Cl. 260—215      20 Claims

ABSTRACT OF THE DISCLOSURE

Process for the sulfation of alcohols such as cellulose and glycerol wherein the reaction can be selectively controlled and the sulfating agent is stable, can be conveniently formed and will readily provide $SO_3$ for the reaction. The process comprises reacting the alcohol with a solution of a complex of $SO_3$ with dimethylformamide.

---

This invention relates to the sulfation of alcohols, more particularly to the sulfation thereof in dimethylformamide (DMF) with oxides of sulfur.

Sulfur trioxide is readily available and has been often considered as a sulfating agent, however, it is extremely reactive and the sulfations conducted therewith are too rapid. Due to this high reactivity considerable heat evolution and also charring of the alcohols (e.g., cellulose) occurs. In other instances the high reactivity of $SO_3$ results in the sulfation being carried to an undesired extent, such as in the case of cellulose, where, regardless of the proportion of $SO_3$, only cellulose trisulfate can be formed if the charring can be substantially suppressed (W. Traube et al., 22 Chem. Abstr. 4793). It has been suggested to suppress the extremely reactive nature of $SO_3$ by mixing it with other materials, the best known of which is pyridine, however, the reactions with this composite sulfating agent could not be well controlled and it was often found to be ineffective in a number of applications.

It is an object of the invention to provide an improved process for the sulfation of alcohols, wherein the reaction can be selectively controlled and the sulfating agent is stable, it can be conveniently formed, and will readily provide $SO_3$ for the reaction.

It is to be understood that the term "alcohol," as used in the specification and claims, is intended to include monohydric and polyhdric alcohols and carbohydrates, the former including long chain monobasic alcohols, such as lauryl alcohol, the latter including aliphatic polyols, such as polyvinyl alcohol; cyclytols, such as inositol; partially alkylated cyclytols, such as quebrachitol and pinitol; glycols and polyglycols, glycerol and polyglycerols, pentaerythritol; hexitols; hexitans; saccharides; etc., and mixtures thereof.

In accordance with the invention, an $SO_3$-dimethylformamide (DMF) complex is used as the sulfating agent. The complex is employed in a solvent, such as excess DMF, or preferably, liquid $SO_2$. Consequently, if the term "solvent" is used in the specification and the claims with regard to the $SO_3$-DMF complex, it is to be understood that it is intended to include excess DMF, liquid $SO_2$; or other solvents of the complex, as to be described below.

The $SO_3$-DMF complex used as the sulfating agent can be prepared according to the process described by W. L. Garbrecht, J. Org. Chem., 24, 370 (1959), whereby an approximately 10 percent by weight solution of $SO_3$ is prepared by adding it slowly to cold, water-free DMF under vigorous stirring. First a solid appears, but it goes again into solution during continued stirring. In storage, the solution turns yellow and then dark orange, but its potency does not diminish.

The $SO_3$-DMF complex is insoluble in carbon tetrachloride or diethylether; however, it was found to be soluble in tetrahydrofuran, formamide, dimethylsulfoxide and $SO_2$. In order to suppress heat evolution, the sulfation reactions are preferably carried out in a surplus of dimethylformamide or in $SO_2$.

In carrying out the sulfation, a solution of the $SO_3$-DMF complex is reacted with the alcohol, after the sulfation is completed the sulfated free acid is neutralized and the alcohol sulfate salt formed with the neutralizing agent is precipitated and recovered. The product, if desired, may subsequently be purified by dialysis or the like.

If desired, the free acid can be obtained from the salt by ion exchange media, or in a like-known manner.

The alcohol and particularly the polyol sulfates can be used, inter alia, as water soluble synthetic gums, soil redeposition-preventing agents, detergents, detergent additives, film formers, viscosity modifiers, thickening agents in paints and the like, stabilizing agents for food products, sizing agents used in the textile industry, finishing materials, additives for use in the paper industry, packaging films, dispersing and emulsifying agents, and a great number of other uses depending on the particular polyol derivative.

The invention is disclosed in greater detail in the following specific examples.

EXAMPLE 1

24 parts by weight (0.3 mol) $SO_3$ were dissolved in 332 parts by weight DMF. The solution was poured onto 16.2 parts by weight (0.1 mol) dry cellulose under stirring. At the time the stirring was started, the pot temperature rose from 24° to 35° C. within the first half hour and the contents of the flask became a fluffy gel, quite different in appearance from the starting cellulose. After 16 hours at room temperature the reaction mixture was heated to 55° C. and the product was completely dissolved. Anhydrous $NH_3$ was bubbled into the solution under constant stirring while the temperature was maintained below 60° C. After the solution became saturated with ammonia, it thickened and some gel appeared. The solution then was poured into diethylether, stirred, filtered, washed with ether and dried under vacuum. The solid was ground to a powder and dried further at 100° C. under vacuum for two hours. 49 parts by weight of a light brown powder were recovered.

EXAMPLE 2

The process was conducted according to Example 1, but the sulfation reaction was concluded after 3 hours at room temperature. Approximately the same yield of an off-white powdered product was recovered.

In the products of Examples 1 and 2, substantially ammonium cellulose disulfate was obtained; i.e., one $NH_4SO_4$-radical for each three cellulosic carbon atoms.

EXAMPLE 3

10.3 parts by weight (0.112 mol) glycerol was sulfated with 27 parts by weight (0.336 mol) $SO_3$ in a similar fashion as the cellulose was sulfated according to Example 2. After saturation with anhydrous ammonia, the solution was still clear and colorless. The product was precipitated with diethylether, filtered, and dried to obtain 49 parts by weight of a white, somewhat hygroscopic powder, substantially ammonium glycerol trisulfate.

EXAMPLE 4

In carrying out the process of this example, a resin reaction flask, equipped with a stirrer, a dropping funnel, a dry ice reflux condenser connected to a calcium chloride tube, and an immersion thermometer were used. Approximately, 1,860 parts by weight $SO_2$ were condensed in the flask and 122 parts by weight (1.53 mols) of $SO_3$ were slowly added. Subsequently 109.6 parts by weight (1.5 mols) DMF were added. To the resulting solution 77 parts by weight (0.475 mol as $C_6H_{10}O_5$) well-dried cellulose (chemical cotton) was added and the stirring started. During stirring, the reaction mixture became more and more pulpy and after four hours it was a thick slurry. All these steps were carried out at $-10°$ C., the boiling point of $SO_2$ at atmospheric pressure. The stirring was continued and the $SO_2$ was allowed to evaporate for 16 hours. Subsequently the off-white residue was taken up with water without stirring, until all the solids dissolved to form a thick colorless solution, containing still considerable amounts of $SO_2$. While adding the water, strong $SO_2$ evolution was noted and the temperature rose to 29° C. Residual $SO_2$ was removed under reduced pressure with an aspirator. The solution was neutralized with 10 N sodium hydroxide during simultaneous ice cooling, and filtered. 5.5 parts by weight unreacted cellulose were recovered. The sulfated product was precipitated in methanol with vigorous agitation. After filtering the precipitate, it was washed with methanol and dried on a steam bath overnight. The resulting product is 248 parts by weight of an off-white powder.

The resulting product was dialyzed and 62.5 parts by weight sodium cellulose disulfate was recovered. A 2% by weight aqueous solution of the pure product exhibited a viscosity ratio expressed as a flow time of 5.22 times that of water under similar conditions.

EXAMPLE 5

The process of Example 4 was repeated, but in this instance the sulfated solution was neutralized with gaseous ammonia and ammonium cellulose disulfate was recovered.

EXAMPLE 6

In a flask 573 parts by weight $SO_2$ were condensed, then 23 parts by weight (0.314 mol) DMF, 23.9 parts by weight (0.298 mol) $SO_3$, and 16.2 parts by weight (0.1 mol) of well-dried cellulose were added in that order. After 3 hours of stirring the reaction mixture, it became a homogeneous, thick slurry. The sulfated cellulose was precipitated with diethyl ether and the product was filtered. After taking the product up with water, it was neutralized with concentrated sodium hydroxide solution, centrifuged (6.2 parts by weight unsulfated cellulose recovered), and precipitated with methanol under vigorous agitation. After filtration, washing with methanol, and drying on steam bath, 60.7 parts by weight of white powder was obtained.

A 20% solution was prepared and dialyzed for 15 hours. The product was recovered by removing most of the water, and precipitating it with absolute methanol, filtering and drying. In the alternative, the product could also be recovered by freeze-drying under reduced pressure. 17.6 parts by weight dialysis-purified product was recovered, having a viscosity ratio expressed as 20.9 times the flow time compared to water under similar circumstances. Analysis of this purified product showed 1.94 atoms of sulfur per hexose unit.

EXAMPLE 7

The process of Example 6 was repeated, however, only 2 hours reaction time was allowed. 49 parts by weight crude products were obtained. On dialysis 19.6 parts by weight purified sodium cellulose disulfate was recovered, having a viscosity ratio expressed as 30.9 times the flow time compared to water under similar circumstances. Analysis of this product showed 2.14 sulfur atoms per hexose unit.

The invention is disclosed by way of particular examples, it is to be understood, however, that by means of the process of the invention a variety of other salts and derivatives may be formed from polyols, under circumstances requiring only routine experimentation to determine the optimum process parameters in view of the present disclosure. Consequently, the full scope of the invention is to be interpreted from the appended claims.

We claim:

1. A process for the sulfation of alcohols which comprises reacting an alcohol selected from the group consisting of cellulose and glycerol with a solution of a complex of $SO_3$ with dimethylformamide.

2. The process of claim 1, wherein said complex is dissolved in dimethylformamide.

3. The process of claim 1, wherein said complex is dissolved in liquid $SO_2$.

4. A process for the sulfation of an alcohol, which comprises reacting an alcohol selected from the group consisting of cellulose and glycerol with a complex of $SO_3$ with dimethylformamide, the complex being dissolved in dimethylformamide and thereby forming the free acid of the alcohol sulfate, converting the free acid into salt, and recovering the salt.

5. A process for the sulfation of alcohols, which comprises reacting an alcohol selected from the group consisting of cellulose and glycerol with a complex of $SO_3$ with dimethylformamide, the complex being dissolved in liquid $SO_2$, maintaining the mixture under conditions at which a substantial portion of said $SO_2$ is kept in the liquid phase until the reaction between the complex and alcohol is substantially advanced, neutralizing the solution and recovering the salt of the alcohol sulfate formed with the agent used in the neutralizing step.

6. A process for the sulfation of cellulose, which comprises mixing cellulose with $SO_3$ and at least about an equimolar amount of dimethylformamide based on $SO_3$, and agitating the mixture while forming the acid sulfate of cellulose.

7. A process for the sulfation of cellulose, which comprises mixing cellulose with $SO_3$ and at least about an equimolar amount of dimethylformamide based on $SO_3$, and agitating the mixture while forming the acid sulfate of cellulose, neutralizing the acid sulfate, and recovering the salt formed with the neutralizing agent.

8. The process of claim 7, wherein the acid sulfate is neutralized with $NH_3$ and the recovered sulfate is the ammonium sulfate of cellulose.

9. The process of claim 7, wherein the acid sulfate is neutralized with a basic alkali compound, and the recovered sulfate is the corresponding alkali sulfate of cellulose.

10. The process of claim 9, wherein the basic alkali compound is sodium hydroxide.

11. The process of claim 7, wherein the mixture of cellulose, dimethylformamide and $SO_3$ further includes liquid $SO_2$ as solvent, and the acid sulfate is neutralized with $NH_3$.

12. The process of claim 7, wherein the mixture of cellulose, dimethylformamide and $SO_3$ further includes liquid $SO_2$ as a solvent, and the neutralizing agent is sodium hydroxide.

13. The process of claim 7, wherein the $SO_3$ and dimethylformamide further contain liquid $SO_2$ as a solvent, and the formation of the cellulose acid sulfate is completed within 1 to 5 hours.

14. A process for the sulfation of glycerol, which comprises mixing glycerol with dimethylformamide and $SO_3$ to form an acid sulfate of glycerol.

15. A process for the sulfation of glycerol, which comprises mixing glycerol with dimethylformamide and $SO_3$ to form an acid sulfate of glycerol, neutralizing the acid sulfate, and recovering the salt formed with the neutralizing agent.

16. The process of claim 15, wherein the acid sulfate is neutralized with a basic alkali compound, and the recovered sulfate salt is the corresponding alkali sulfate of glycerol.

17. The process of claim 16, wherein the basic alkali compound is sodium hydroxide.

18. A process for the sulfation of cellulose, which comprises mixing cellulose with $SO_3$ and dimethylformamide dissolved in $SO_2$, the dimethylformamide and $SO_3$ being present in substantially equimolar amounts and 1 to 5 mols of the equimolar amount being present for each hexose unit of the cellulose, maintaining the mixture for 0.1 to 24 hours under agitation at conditions maintaining a substantial part of said $SO_2$ in the liquid phase to form the acid sulfate of cellulose, neutralizing the acid sulfate, and recovering the salt formed with the neutralizing agent.

19. The process of claim 18, further including the step of purifying the recovered salt by dialysis.

20. A process for the sulfation of cellulose which comprises reacting cellulose with a solution of a complex of $SO_3$ with dimethyl-formamide.

References Cited

UNITED STATES PATENTS

| | | | |
|---|---|---|---|
| 3,200,110 | 8/1965 | Gollin et al. | 260—210 |
| 3,057,855 | 10/1962 | Smith et al. | 260—233.5 |
| 3,077,373 | 2/1963 | Kerr | 260—233.5 |
| 3,070,595 | 12/1962 | Petracek et al. | 260—234 |

DONALD E. CZAJA, Primary Examiner

R. W. GRIFFIN, Assistant Examiner

U.S. Cl. X.R.

252—316, 351; 260—209, 458, 686